(No Model.)
E. R. KNOWLES.
ABSORPTIVE MATERIAL FOR STORAGE BATTERIES.
No. 538,919.
Patented May 7, 1895.
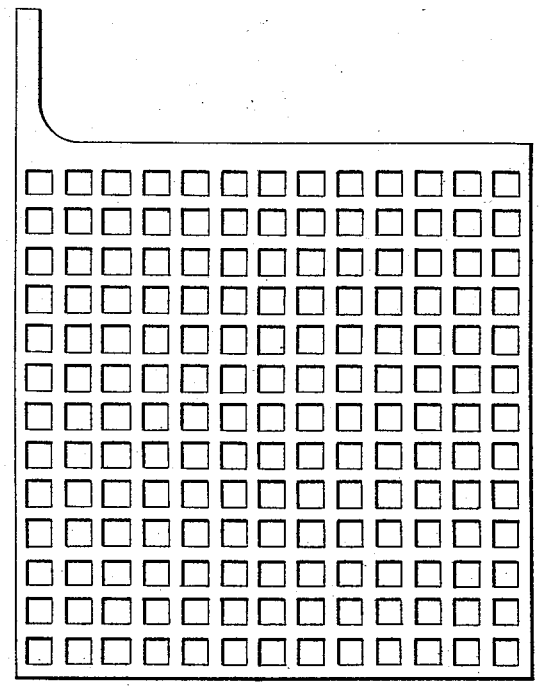
Witnesses.
John C Sanders
Clinton M. Ball
Inventor.
Edward R Knowles
By his Attorney,
C. A. Buckingham

UNITED STATES PATENT OFFICE.

EDWARD R. KNOWLES, OF BROOKLYN, NEW YORK.

ABSORPTIVE MATERIAL FOR STORAGE-BATTERIES.

SPECIFICATION forming part of Letters Patent No. 538,919, dated May 7, 1895.

Application filed October 15, 1891. Serial No. 408,819. (No specimens.)

*To all whom it may concern:*

Be it known that I, EDWARD R. KNOWLES, a citizen of the United States, and a resident of Brooklyn, in the county of Kings and State of New York, have invented certain new and useful Improvements in Absorptive Material for Storage-Batteries, of which the following is a specification.

My invention relates to improvements in absorptive material for storage batteries, and has for its object the making of an absorptive material for use in storage batteries, especially those of the lead-lead-oxide type, which shall overcome certain defects in this type of batteries as now made.

The drawing represents a side view of a storage-battery plate.

In the manufacture of pasted plates of the lead-lead oxide type the absorptive material in the form of litharge, (the yellow oxide of lead) or minium (the red oxide of lead) is made into a pasty mass with a solution of sulphuric acid and water, just enough of this solution being used to render the mass plastic when pasted into the plate. The result of this treatment of the oxide is to partially sulphate a portion of it, as much as the small amount of acid in the solution can act upon, leaving the plate pasted with a mixture of oxide and sulphate of lead. When this plate is immersed in the battery solution for formation, this solution being sulphuric acid and water also, the action of sulphating the oxide, incomplete in the first instance, for lack of sufficient acid, recommences and continues until all of the oxide is sulphated that can be, which in the case of the yellow oxide is all of it, and in the case of the red oxide a large portion of it, the red oxide being practically a combination of the peroxide and the yellow oxide. If a given mass of lead be made into the yellow oxide, its mass will be much greater than that of the lead from which it was made and it will occupy more space. It is the same way with the red oxide, the peroxide, and the sulphate, and their relative masses will be in the order above named, viz:—lead, yellow oxide, red oxide, peroxide and the sulphate, the peroxide and the sulphate being very nearly the same in mass, the peroxide being slightly the smaller. Now, the mass of material pasted into the plate being confined in its perforations and incompletely sulphated, when immersed in the battery solution, begins to sulphate again and as the sulphate requires more space than the oxide from which it is made one or two things or both must occur. Either the plate will curl or buckle or the active material will be forced out of the plate, by its increasing bulk. This is one of the most serious difficulties to be met with in this type of plate. If this class of absorptive material in the form of a dry powder be compressed into the perforations or grooves in the plates, this action is still more pronounced on account of the largely increased mass of material to be acted upon on account of its compressed condition. It is the object of this invention to obviate these difficulties.

I have discovered that if the oxide or preferably a mixture of the oxides, red and yellow in certain proportions, as seventy-five per cent. of red and twenty-five per cent. of yellow oxides, be subjected to the action of dilute sulphuric acid and water until fully acted upon by the acid, that is, until all the oxide which can be sulphated is sulphated, there will remain a mixture of the peroxide and sulphate of lead, a mixture which has as large a bulk as any salts of lead can have, and one which no matter how acted upon will never increase in bulk. This mixture is then carefully dried and powdered and may be used, mixed with water as a paste to be pasted into plates, if this method is used, or it may be used as a dry powder and compressed into the plates mechanically, or it may be compressed into plates or blocks which may afterward be inserted in the plates or between layers of metal suitably fastened together, or molds of any desired form or shape may be filled with it by any suitable means while it is in a plastic condition. This molded plastic mass may then be removed from the molds and dried in any suitable manner, thus forming bricks or plates of the absorptive material which then may be inserted in the plates, or between layers of metal, suitably fastened together. In any event, in whatever way it is used it will never under any usage increase in bulk in such a manner as to cause the difficulties already mentioned and thus the object of this invention, the making of an absorptive material for storage battery plates and especially those of the lead-lead oxide type, which will not increase in its bulk, under the conditions to which it is subjected in practice is attained.

Having thus described my invention, what I claim, and desire to patent, is—

1. The method of forming an absorptive material for storage batteries which consists in first making a mixture of red oxide of lead and yellow oxide of lead, and then subjecting such mixture to a complete process of sulphation before its application to battery plates.

2. The method of applying absorptive material to the elements of secondary batteries which consists in forming into bricks or plates for subsequent application in such batteries the products resulting from the complete sulphation of a mixture formed of red oxide of lead, and yellow oxide of lead for the purpose set forth.

3. The process herein described of forming an absorptive material for storage batteries, consisting in first making a mixture of seventy-five per cent. of red oxide of lead, and twenty-five per cent. of yellow oxide of lead, and then treating this mixture with sulphuric acid and water until complete sulphation has taken place, substantially as described.

4. The process herein described of forming the absorptive material for storage batteries, consisting in making a mixture of seventy-five per cent. of red oxide of lead and twenty-five per cent. of yellow oxide of lead, then treating this mixture with sulphuric acid and water until complete sulphation has taken place, and then forming the resulting mixture into bricks or plates substantially as described.

Signed at New York, in the county of New York and State of New York, this 10th day of May, A. D. 1891.

EDWARD R. KNOWLES.

Witnesses:
E. V. MYERS,
J. B. SABINE.